US010846080B2

(12) United States Patent
Tripp et al.

(10) Patent No.: US 10,846,080 B2
(45) Date of Patent: Nov. 24, 2020

(54) COOPERATIVE UPDATING OF SOFTWARE

(71) Applicant: International Business Machines Corporation, Armonk, NY (US)

(72) Inventors: Omer Tripp, Bronx, NY (US); Marco Pistoia, Amawalk, NY (US); Pietro Ferrara, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/123,633

(22) Filed: Sep. 6, 2018

(65) Prior Publication Data
US 2020/0081705 A1   Mar. 12, 2020

(51) Int. Cl.
| | |
|---|---|
| *G06F 8/656* | (2018.01) |
| *G06F 11/36* | (2006.01) |
| *G06F 11/30* | (2006.01) |
| *G06F 8/61* | (2018.01) |
| *H04L 29/08* | (2006.01) |
| *G06F 9/4401* | (2018.01) |

(52) U.S. Cl.
CPC ............... *G06F 8/656* (2018.02); *G06F 8/64* (2013.01); *G06F 9/4418* (2013.01); *G06F 11/302* (2013.01); *G06F 11/3612* (2013.01); *H04L 67/34* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 7,020,875 B2 | 3/2006 | Zweifel et al. | |
| 7,424,706 B2 | 9/2008 | Ivanov et al. | |
| 8,205,195 B2 | 6/2012 | Wagner et al. | |
| 2005/0071838 A1* | 3/2005 | Hatasaki | G06F 8/64 717/168 |
| 2006/0136898 A1 | 6/2006 | Bosscha et al. | |
| 2006/0248522 A1 | 11/2006 | Lakshminarayanan et al. | |
| 2007/0261124 A1* | 11/2007 | Centonze | G06F 21/6227 726/27 |
| 2008/0163192 A1 | 7/2008 | Jha et al. | |
| 2009/0187725 A1* | 7/2009 | Mencias | G06F 9/44557 711/171 |

(Continued)

*Primary Examiner* — Daxin Wu
(74) *Attorney, Agent, or Firm* — Scully, Scott, Murphy & Presser, P.C.; Daniel Morris, Esq.

(57) ABSTRACT

A method, system and computer readable program product for cooperative modifying of a software program. In an embodiment, the invention provides a method comprising monitoring two or more running executions of the same software program at two or more user computer systems; detecting an issue with one of the executions; suspending the running executions of the software program; determining a fix to the software program; modifying the software program with the fix on the two or more user computer systems; and resuming the running executions of the software program. In an embodiment, the executions are run at one server computer; and modifying the software program with the fix comprises performing one server instance update to modify all the running executions of the software program with the fix. In an embodiment, the method further comprises issuing notifications to users that the software program has been modified with the fix.

20 Claims, 3 Drawing Sheets

(56) References Cited

U.S. PATENT DOCUMENTS

| | | | |
|---|---|---|---|
| 2009/0210649 A1* | 8/2009 | Wan | G06F 9/30087 |
| | | | 711/170 |
| 2009/0259999 A1 | 10/2009 | Srinivasan | |
| 2013/0254747 A1* | 9/2013 | Citron | G06F 11/3672 |
| | | | 717/126 |
| 2013/0283239 A1 | 10/2013 | Baker et al. | |
| 2013/0326494 A1* | 12/2013 | Nunez | H04L 41/082 |
| | | | 717/172 |
| 2013/0340074 A1 | 12/2013 | Ayachitula et al. | |
| 2015/0026675 A1* | 1/2015 | Csaszar | G06F 8/61 |
| | | | 717/178 |
| 2016/0004606 A1 | 1/2016 | Mishra et al. | |
| 2016/0092191 A1* | 3/2016 | Ueda | G06F 8/61 |
| | | | 717/178 |
| 2016/0103673 A1 | 4/2016 | Curran et al. | |
| 2016/0232346 A1 | 8/2016 | Paddon et al. | |
| 2017/0068532 A1* | 3/2017 | Kobayashi | G06F 8/65 |
| 2017/0168804 A1* | 6/2017 | Lang | G06F 16/27 |
| 2018/0210818 A1* | 7/2018 | Hwang | G06F 11/3688 |
| 2019/0227781 A1* | 7/2019 | Ramasamy | G06F 8/65 |
| 2019/0369977 A1* | 12/2019 | Wiswall | G06F 8/61 |

* cited by examiner

```
String username = request.getParameter("name"); // L
if (isUserAdmin(username)) {
    username = "admin:" + username; // L 1, 1
    db.update( ... + username + ... ); // L 1,2
} else {
    username = "user:" + username; // L2, 1
    db.update( ... + username + ... ); // L2,2
}
```

COOPERATIVE UPDATING OF SOFTWARE

BACKGROUND

This invention relates generally to data processing, and more specifically, to updating or fixing software running on computers.

Software applications are often released with security defects. Detecting these defects statically is challenging because of the high rate of false positives. Fixing security defects offline based on dynamic analysis of the application is also problematic because of the coverage limitations of dynamic analysis.

An alternative to static and dynamic analysis, known as Runtime Application Self Protection (RASP), is to protect the application at runtime. So, for example, the runtime system may track and propagate a taint bit during the execution of the target application. The bit is first generated at a source statement (i.e., a statement reading user-provided input), and the analysis subsequently checks whether any value arriving at a sink statement (i.e., a statement performing a security-sensitive operation) has its corresponding taint bit turned on.

While the RASP approach obviates the inherent limitations of both static and dynamic compile-time (or offline) analysis, the RASP approach introduces unique problems of its own: cost and quality. Cost may be significant because online patching of a security defect is potentially expensive. Quality may be an issue in that the patch may solve the defect in an ad-hoc manner (e.g. being overly specific).

SUMMARY OF THE INVENTION

Embodiments of the invention provide a method, system and computer readable program product for cooperative modifying of a software program. In an embodiment, the invention provides a method comprising monitoring two or more different running executions of the same software program at two or more user computer systems; detecting a defined issue with one of said executions; suspending all the running executions of the software program; determining a fix to the software program for said defined issue; modifying the software program with the fix on the two or more user computer systems; and resuming all the running executions of the software program.

In an embodiment, all the running executions are running at one server computer; and modifying the software program with the fix comprises performing one server instance update to modify all the running executions of the software program with the fix.

In an embodiment, the method further comprises issuing notifications to users of the user computer systems that the software program on the user computer systems have been modified with the fix.

In an embodiment, different users are running the software program on different computer system architectures; and the method further comprises determining more than one fix for the software program, and distributing the fixes for more than one computer system architecture.

DETAILED DESCRIPTION

Embodiments of the invention fix or update software running on computers. Generally, this is done by use of a cooperative setting for generating updates or patches to the software. A software patch is a piece of software designed to update a computer program to improve or fix the program. This includes, for instance, improving the usability or performance of the program and addressing vulnerabilities and defects of the program.

Figures 1, 2:
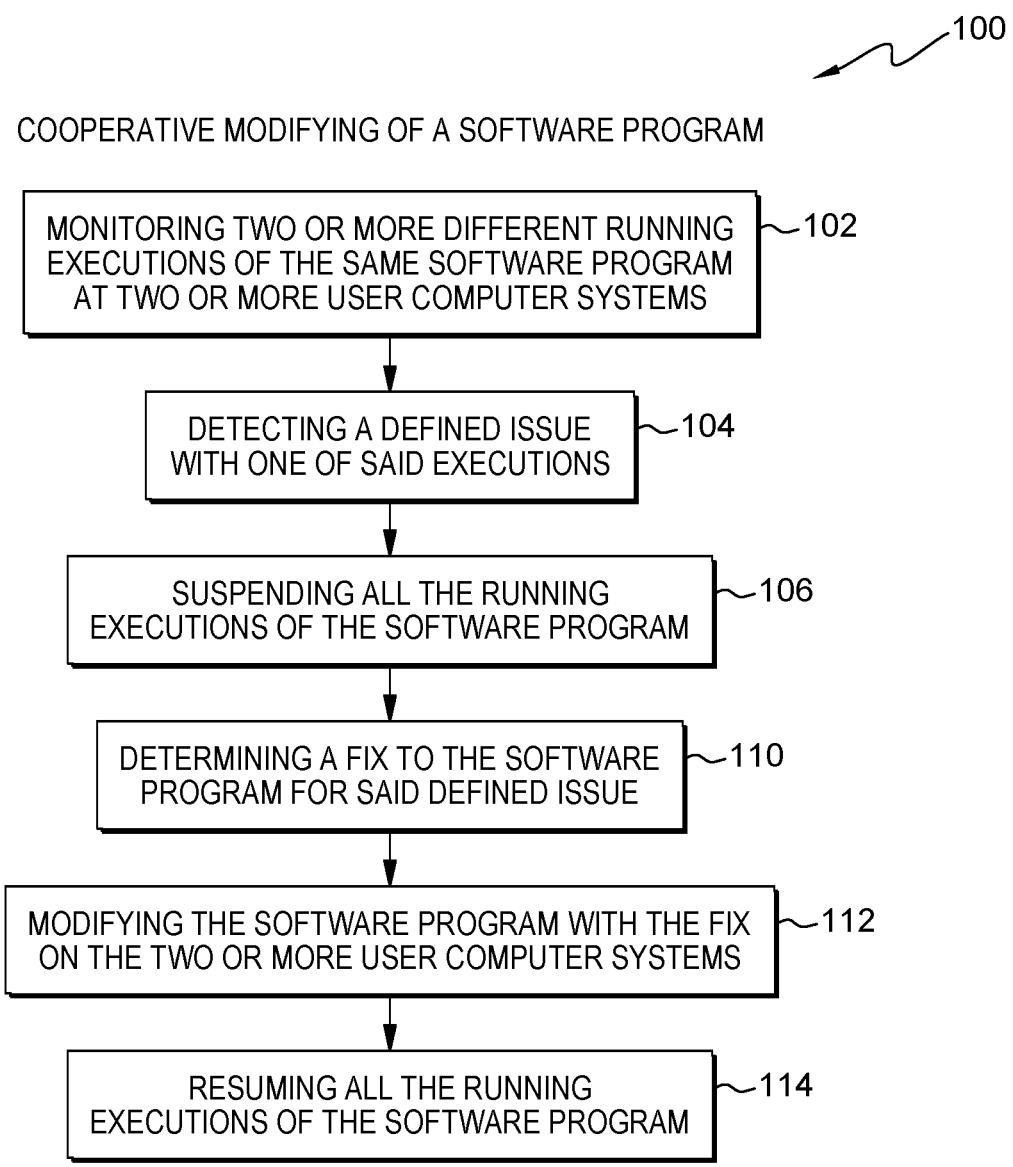
FIG. 1 shows a flow diagram for patching software in accordance with an embodiment of the invention.
FIG. 2 illustrates example code for a patching algorithm in accordance with an embodiment of the invention.

FIG. 1 illustrates and embodiment of this invention. This embodiment provides a method 100 of cooperative modifying of a software program. This method comprises, at 102, monitoring two or more different running executions of the same software program at two or more user computer systems, at 104, detecting a defined issue with one of said executions, and at 106, suspending all the running executions of the software program. In this embodiment, the method also comprises, at 110, determining a fix to the software program for said defined issue, at 112, modifying the software program with the fix on the two or more user computer systems, and at 114, resuming all the running executions of the software program.

Embodiments of the invention cast the Runtime Application Self Protection (RASP) approach into a cooperative setting, wherein multiple instances of a given application are run simultaneously by different users. The availability of multiple application instances can be utilized in two ways. First, if a security defect is detected and remedied over the execution session of one user, then the fix can be seamlessly propagated into the code of other users. This addresses the cost of computing an online patch via reuse—that is, be reusing a fix. Second, to address the issue of patch quality, the analysis is now able to simultaneously consider multiple defects that are potentially related. Thus, when propagating a fix from one user to another user, the analysis may decide to merge or transform the current set of fixes (old fixes plus the new one) to generate a more optimal set of patches.

As discussed above, a runtime system may track and propagate a taint bit during the execution of a target application. Taint bits, for example, may be associated with registers, memory pages and I/O ports. As a more specific, but non-exclusive example, a register can include a bit for a corresponding taint flag, a memory page can include a bit for a corresponding taint flag, and an input/output (I/O) port can include a bit for a corresponding taint flag.

Through the use of these taint flags, an indication of whether data (or other data derived from that data) is tainted can follow the data (or the derived data) through the instruction execution flow for a computer. To this end, whenever tainted data is stored in a physical memory location, a corresponding taint flag is set for the physical memory location. Conversely, whenever data is read from a physical memory location, a check is performed to determine whether the data is tainted. In practice, a single taint flag could be used to indicate tainted data for a page of physical memory locations.

A critical execution operation (e.g., a system call) may thus readily determine whether tainted data is being passed to the operation. If so, the operation may raise an exception to prevent the tainted data from corrupting the operation.

In embodiments of the invention, the computer system has the ability to instrument the behavior of an application so as to enable runtime tracking of its execution as well as virtual patching. This can be achieved through either (i) compile-time code editing, (ii) dynamic instrumentation, or (iii) dedicated middleware. Implementations of these techniques are well known and understood in the art.

An important aspect of the instrumentation is to share data between users of the application. In a mobile setting, for example, the application can be modified before or when it is placed into the repository (for example, an organizational store). Opening a channel of communication between different instances of the application is used to share patches and to improve the quality of patches.

FIG. 2 shows a patching algorithm that illustrates the value of considering multiple patches in concert via an example.

Here, a naive patch—in the form of a sanitizer or validator call—based on a single execution, would either be placed between L1,1 and L1,2 or the patch would be placed between L2,1 and L2,2. However, taking account of two different fixes due to two different executions (one for an admin and another for a standard user) could lead to an improved path, wherein the sanitizer or validator call is inserted immediately after the line with label L.

In embodiments of the invention, tracking and patching of multiple instances leads not only to sharing of patches but also to incremental improvement of the quality of the patches, as the above-example illustrates. At the point when the patching agent assigned to a given instance receives a new patch update, the agent considers the existing set of patches and decides how to redo the patches such as to maximize the quality of the patches. If a nontrivial transformation is applied, then the resulting set of patches is communicated to the other instances (similarly to the standard update).

Figure 3:
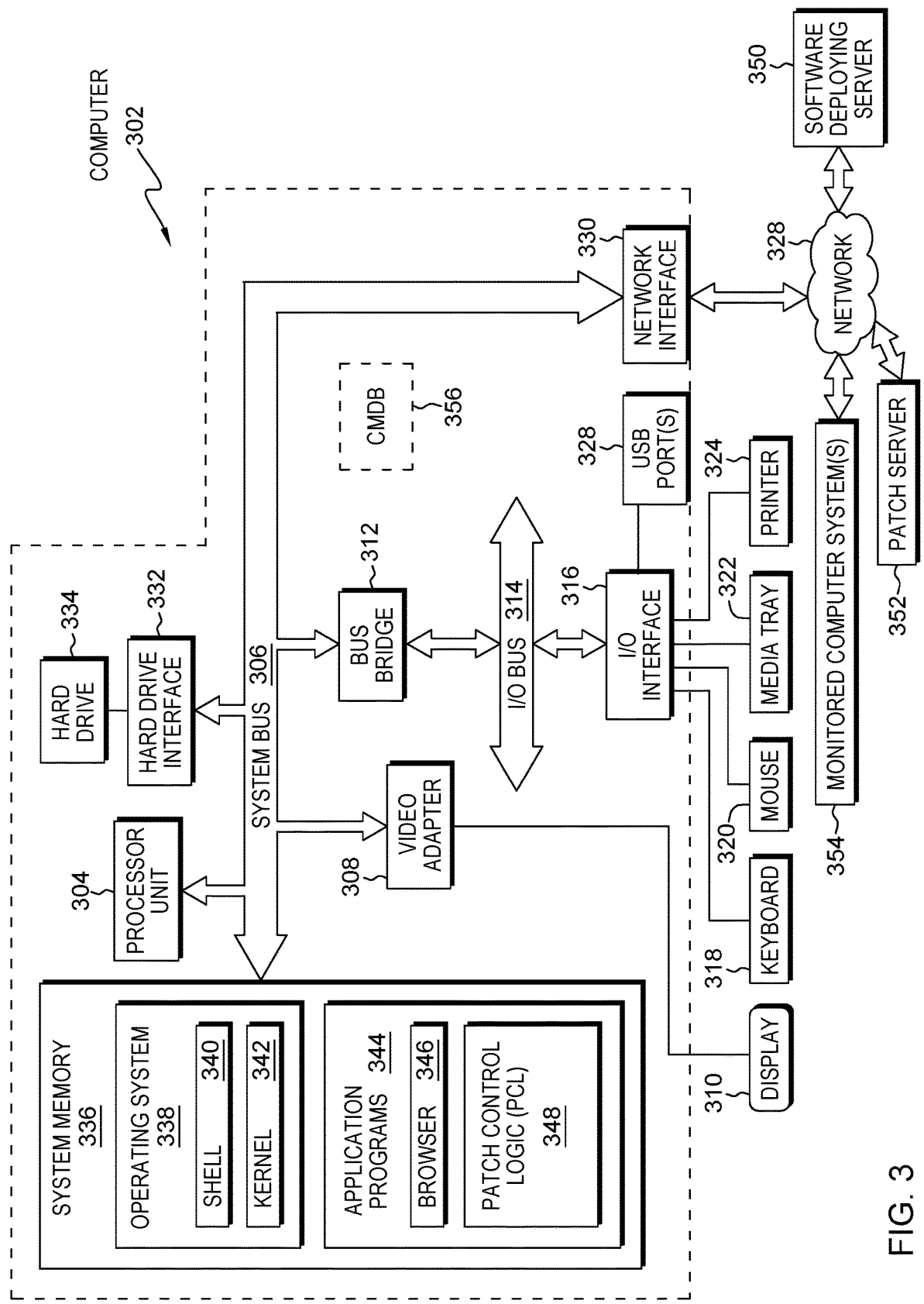
FIG. 3 is a block diagram of an exemplary system and network that may be utilized by or in the implementation of the present invention.

FIG. 3 depicts a block diagram of an exemplary system and network that may be utilized by and/or in the implementation of the present invention. Note that some or all of the exemplary architecture, including both depicted hardware and software, shown for and within computer 302 may be utilized by software deploying server 350, patch server 352, and/or monitored computer system(s) 354.

Exemplary computer 302 includes a processor 304 that is coupled to a system bus 306. Processor 304 may utilize one or more processors, each of which has one or more processor cores. A video adapter 308, which drives/supports a display 310, is also coupled to system bus 306. System bus 306 is coupled via a bus bridge 312 to an input/output (I/O) bus 314. An I/O interface 316 is coupled to I/O bus 314. I/O interface 316 affords communication with various I/O devices, including a keyboard 318, a mouse 320, a media tray 322 (which may include storage devices such as CD-ROM drives, multi-media interfaces, etc.), a printer 324, and external USB port(s) 326. While the format of the ports connected to I/O interface 316 may be any known to those skilled in the art of computer architecture, in one embodiment some or all of these ports are universal serial bus (USB) ports.

As depicted, computer 302 is able to communicate with a software deploying server 350, as well as patch server 352 and/or monitored computer system(s) 354, using a network interface 330. Network interface 330 is a hardware network interface, such as a network interface card (NIC), etc. Network 328 may be an external network such as the Internet, or an internal network such as an Ethernet or a virtual private network (VPN).

A hard drive interface 332 is also coupled to system bus 306. Hard drive interface 332 interfaces with a hard drive 334. In one embodiment, hard drive 334 populates a system memory 336, which is also coupled to system bus 306. System memory is defined as a lowest level of volatile memory in computer 302. This volatile memory includes additional higher levels of volatile memory (not shown), including, but not limited to, cache memory, registers and buffers. Data that populates system memory 36 includes computer's 302 operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a renderer, shown in exemplary manner as a browser 346. Browser 346 includes program modules and instructions enabling a world wide web (WWW) client (i.e., computer 302) to send and receive network messages to the Internet using hypertext transfer protocol (HTTP) messaging, thus enabling communication with software deploying server 350, patch server 352, monitored computer system(s) 354, and other computer systems.

Application programs 344 in computer's 302 system memory (as well as software deploying server's 350 system memory) also include a patch control logic (PCL) 348. PCL 348 includes code for implementing the processes described above, including those described in FIG. 2. In one embodiment, computer 302 is able to download PCL 348 from software deploying server 350, including in an on-demand basis, wherein the code in PCL 348 is not downloaded until needed for execution. Note further that, in one embodiment of the present invention, software deploying server 350 performs all of the functions associated with the present invention (including execution of PCL 348), thus freeing computer 302 from having to use its own internal computing resources to execute PCL 348.

Patch server 352 provides notice of and/or delivery of software patches, which are delivered to monitored computer system(s) 354 (e.g., servers) under the supervision and management of a computer monitoring hardware system such as computer 302.

Note that the hardware elements depicted in computer 302 are not intended to be exhaustive, but rather are representative to highlight essential components required by the present invention. For instance, computer 302 may include alternate memory storage devices such as magnetic cassettes, digital versatile disks (DVDs), Bernoulli cartridges, and the like. These and other variations are intended to be within the spirit and scope of the present invention.

Figure 4:
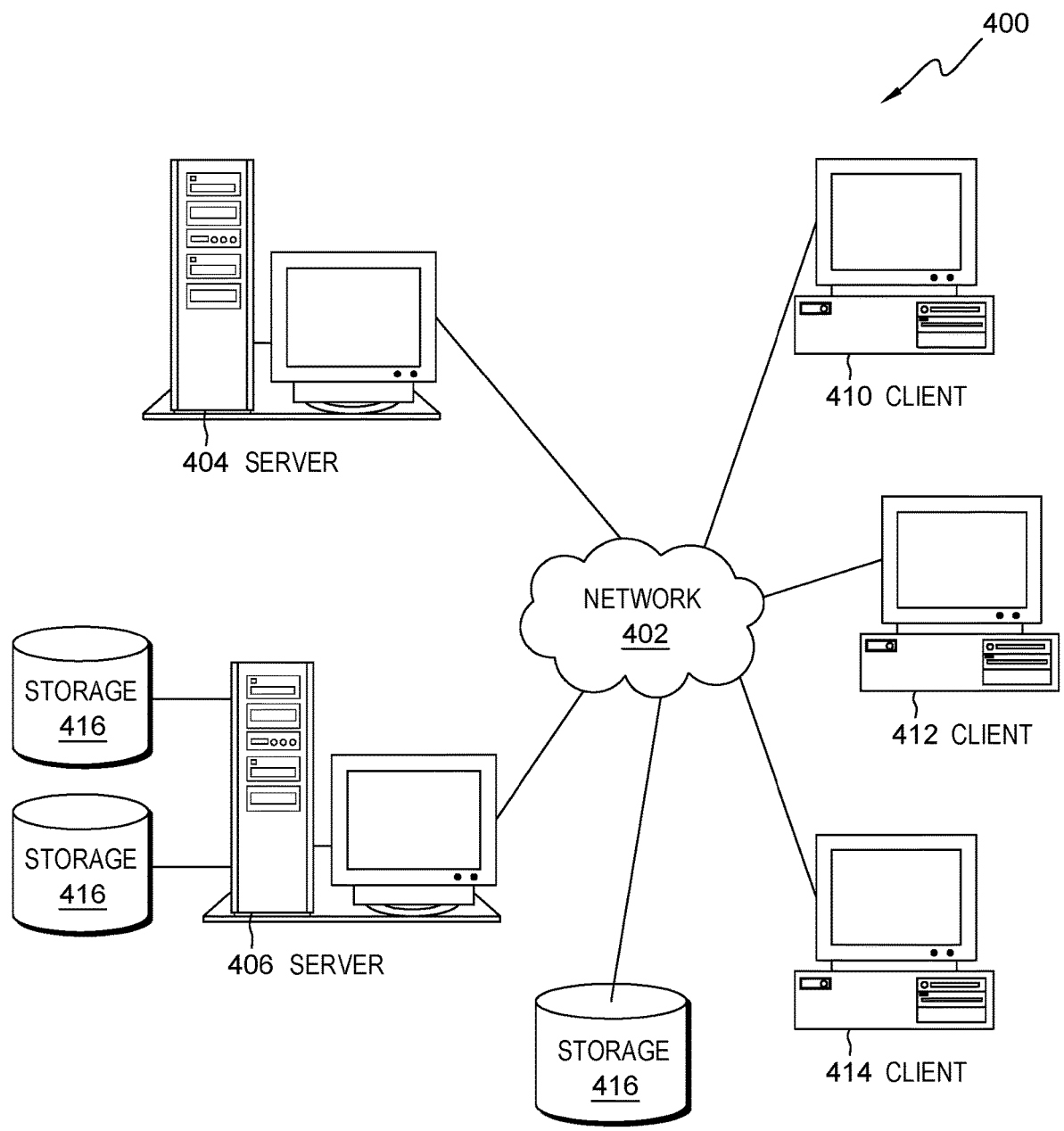
FIG. 4 depicts components of a computing network in which aspects of embodiments of the invention may be implemented.

FIG. 4 shows components of a computing network 400 that may be used in embodiments of the invention. As shown, computing network 400 includes servers 404 and 406, client devices 410, 412 and 414, and data storage devices 416.

Client devices 410, 412 and 414 represent suitable computing or processing devices that may be used in computing network 400. For instance, the client devices may comprise personal computers, laptop computers, handheld computers, tablet computers, or Personal Digital Assistants (PDAs). The client devices may also include cellular telephones, smart phones, wearable computers and the like.

The servers 404 and 406 are configured to receive inputs from or about the client devices. The servers may process the received data and provide services to the client devices, in the manner discussed above.

Servers 404 and 406 may include virtually any device that may be configured to provide an application service in computing network 400. Such application services or simply applications include, but are not limited to, patch control logic, email applications, search applications, video applications, audio applications, graphic applications, social networking applications, text message applications, or the like. In one embodiment, servers 404 and 406 may operate as web servers. However, servers 404 and 406 are not limited to web servers.

Storage devices 416 may comprise any suitable data storage devices, and the devices may be directly connected to one or more of the servers 404 and 406, or the storage devices may be accessed via network 402.

Network 402 is enabled to employ any form of computer readable media for communicating information from one electronic device to another. Network 402 can include the Internet, comprised of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, governmental, educational and other computer systems that route data and messages. Network 402 may also be implemented as a number of different types of networks, such as for example, an intranet, a local area network (LAN), or a wide area network (WAN). Network may also provide direct connections, such as through a universal serial bus (USB) port, other forms of computer-readable media, or any combination thereof.

Those of ordinary skill in the art will appreciate that the architecture and hardware depicted in FIG. 4 may vary. Not all the illustrated components may be required to practice the invention, and variations in the arrangement and type of the components may be made without departing from the spirit or scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of cooperative modifying of a software program, comprising:
monitoring two or more different running executions of the same software program at two or more user computer systems;
detecting a defined issue with one of said executions;
suspending all the running executions of the software program;
determining a fix to the software program for said defined issue;
downloading patch control logic for implementing the fix to the software program, in an on-demand basis;
opening a channel of communication between the two or more different running executions of the software program to share the fix between the two or more user computer systems;
executing the patch control logic to insert the fix in the software program on the two or more user computer systems to update the software program; and
resuming all the running executions of the software program.

2. The method according to claim 1, wherein:
all the running executions are running at one server computer; and
modifying the software program with the fix comprises performing one server instance update to modify all the running executions of the software program with the fix.

3. The method according to claim 1, further comprising issuing notifications to users of the user computer systems that the software program on the user computer systems have been modified with the fix.

4. The method according to claim 1, further comprising sending the fix to other users not currently running the software program.

5. The method according to claim 1, wherein:
different users are running the software program on different computer system architectures; and
the method further comprises determining more than one fix for the software program, and distributing the fixes for more than one computer system architecture.

6. The method according to claim 1, wherein the modifying the software program with the fix includes a first of the user computer systems receiving the fix, and said first of the user computer systems sending the fix to a second of the user computer systems.

7. The method according to claim 6, wherein:
the modifying the software program with the fix further includes said first of the user computer systems changing the fix; and
said first of the user computer systems sending the fix to a second of the user computer systems includes said first of the user computer systems sending the changed fix to the second of the user computer systems.

8. The method according to claim 1, wherein:
a multitude of executions of the software programs are running on a multitude of user computer systems;
the modifying the software program with the fix includes sending the fix to all the multitude of the user computer systems, from one of the user computer systems to another of the user computer systems, in sequence; and
the suspending all the running executions of the software program includes suspending all the running executions of the software program until the fix is applied to all the user computer systems in said sequence.

9. The method according to claim 1, wherein the suspending all the running executions of the software program includes suspending all the running executions of the software program after the detecting the defined issue with one of said executions.

10. The method according to claim 1, wherein the resuming all the running executions of the software program includes resuming all the running executions of the software program after the modifying the software program with the fix on the two or more user computer systems.

11. The method according to claim 1, wherein:
the detecting a defined issue with one of said executions includes detecting multiple defects with the two or more running executions of the software program;
the modifying the software program with the fix on the two or more user computer systems includes propagating the fix from one of the computer systems to another of the computer systems;
the fix is a new fix; and
the method further comprises simultaneously considering the multiple defects including, when propagating the fix from one of the computer systems to another of the computer systems, transforming a current set of fixes by combining the current set of fixes with the new fix to generate another set of fixes.

12. The method according to claim 1, wherein:
the downloading patch control logic includes downloading the patch control logic from a software deploying server; and
the patch control logic is not downloaded until needed for execution.

13. The method according to claim 1, wherein:
the fix is a new fix;
the executing the patch control logic to insert the fix in the software program on the two or more user computer systems to update the software program includes a patching agent, assigned to a given instance of the running executions of the software program, receiving the fix, and the patching agent considering an existing set of fixes and deciding how to redo the existing set of fixes to transform the existing set of fixes into a resulting set of fixes; and
the method further comprises communicating the resulting set of fixes to other instances of the software program.

14. A system for cooperative modifying of a software program, comprising:
one or more processing units configured for:
monitoring two or more different running executions of the same software program at two or more user computer systems;
detecting a defined issue with one of said executions;
suspending all the running executions of the software program;
determining a fix to the software program for said defined issue;
downloading patch control logic for implementing the fix to the software program, in an on-demand basis;
opening a channel of communication between the two or more different running executions of the software program to share the fix between the two or more user computer systems;
executing the patch control logic to insert the fix in the software program on the two or more user computer system to update the software program; and
resuming all the running executions of the software program.

15. The system according to claim 14, wherein:
all the running executions are running at one server computer; and
the modifying the software program with the fix comprises performing one server instance update to modify all the running executions of the software program with the fix.

16. The system according to claim 14, wherein the one or more processing units are further configured for issuing notifications to users of the user computer systems that the software program on the user computer systems have been modified with the fix.

17. The system according to claim 14, wherein:
different users are running the software program on different computer system architectures; and
the one or more processing units are further configured for determining more than one fix for the software program, and distributing the fixes for more than one computer system architecture.

18. A computer readable program product comprising:
a computer readable storage medium having computer program code tangibly embodied therein for cooperative modifying of a software program, the computer program code, when executed in a computer system, performing the following:
monitoring two or more different running executions of the same software program at two or more user computer systems;
detecting a defined issue with one of said executions;
suspending all the running executions of the software program;
determining a fix to the software program for said defined issue;
downloading patch control logic for implementing the fix to the software program, in an on-demand basis;
opening a channel of communication between the two or more different running executions of the software program to share the fix between the two or more user computer systems;
executing the patch control logic to insert the fix in the software program on the two or more user computer systems to update the software program; and
resuming all the running executions of the software program.

19. The computer program product according to claim 18, wherein:
all the running executions are running at one server computer; and
the modifying the software program with the fix comprises performing one server instance update to modify all the running executions of the software program with the fix.

20. The computer program product according to claim 18, wherein the computer program code, when executed in the computer system, performs:
issuing notifications to users of the user computer systems that the software program on the user computer systems have been modified with the fix.

* * * * *